United States Patent
Blevins (10) Patent No.: US 8,731,729 B2
(45) Date of Patent: May 20, 2014

(54) METHOD FOR MICROGRID CONTROLS DEVELOPMENT

(75) Inventor: William Mark Blevins, Albuquerque, NM (US)

(73) Assignee: Honeywell International, Inc, Morristown, NJ (US)

( * ) Notice: Subject to any disclaimer, the term of this patent is extended or adjusted under 35 U.S.C. 154(b) by 37 days.

(21) Appl. No.: 13/453,665

(22) Filed: Apr. 23, 2012

(65) Prior Publication Data

US 2013/0282194 A1 Oct. 24, 2013

(51) Int. Cl.
  *G06F 1/26* (2006.01)
(52) U.S. Cl.
  USPC .................. 700/291; 703/13; 703/22
(58) Field of Classification Search
  USPC .......... 700/22, 286, 291, 295; 703/13, 18, 22
  See application file for complete search history.

(56) References Cited

U.S. PATENT DOCUMENTS

| | | | |
|---|---|---|---|
| 7,233,843 B2 * | 6/2007 | Budhraja et al. | 700/291 |
| 8,065,041 B2 * | 11/2011 | Yao et al. | 700/286 |
| 8,364,609 B2 * | 1/2013 | Ozog | 705/412 |
| 8,401,709 B2 * | 3/2013 | Cherian et al. | 700/291 |
| 2012/0022713 A1 | 1/2012 | Deaver et al. | |

* cited by examiner

*Primary Examiner* — Charles Kasenge
(74) *Attorney, Agent, or Firm* — Shimokaji & Associates, P.C.

(57) ABSTRACT

A process develops controls for microgrid systems. The process models physical systems of increasing complexity. Candidate control algorithms are implemented as state machines that can affect state variables which represent control signals for elements of the physical system. A simulation of the physical system is operated according to the control algorithms.

20 Claims, 6 Drawing Sheets

METHOD FOR MICROGRID CONTROLS DEVELOPMENT

GOVERNMENT RIGHTS

This invention was made with Government support under the TARDEC SCMG contract number, W56 HZV-10-C-0152, awarded by the U.S. Army, TARDEC. The Government has certain rights in this invention.

BACKGROUND OF THE INVENTION

The present invention generally relates to modeling systems, and more particularly, to a method for microgrid controls development.

Microgrids are local implementations of a power distribution system that emulate the operation of standard utility grids on a smaller scale. These systems are a rapidly growing segment of the power industry. In general, they are required to manage sources, loads and storage systems to optimize availability, economy, reliability, etc. Sources used in microgrid systems can vary widely. For example, utility grids, diesel generators, wind turbines, photovoltaic systems, and gas turbines are some sources tied to a microgrid system. Microgrids can deliver power as AC or DC. The loads a microgrid system supplies can also be AC or DC in nature, and vary widely in their power requirements both initially and over time. In addition, it is often desirable to assign different priorities to loads to ensure that critical loads are given top priority in case the power available is insufficient to supply all loads. Also, microgrid systems may include storage systems configured as energy reservoirs that typically store energy when it is readily available or inexpensive, and may act as secondary sources for the system loads when it is advantageous to employ them. The typical microgrid system should accommodate these diverse subsystems and optimize their management.

The power in a microgrid system may be routed from sources to loads by means of circuits controlled by 'switchgear', which is a class of devices designed for their power handling characteristics. Switchgear typically have a binary control characteristic (two allowed states; on/off). Sources are generally managed as two-state components (on/off), with the classic analog control functions (such as engine throttle in the case of diesel generators) implemented as embedded subsystem functions.

The proliferation of switchgear and the associated control signals in modern microgrids leads to what is termed in mathematics and computer science as a 'combinatorial explosion'. If there are n Boolean state variables associated with a microgrid there will be $2^n$ possible states. For example, a typical microgrid system may include 15 switchgear variables associated with sources and 13 with loads. If the system comprises 4 additional switching components there is a complexity on the order of $2^{(15+13+4)}=2^{32}=1024$ possible states. In addition, if each of the 13 loads can be assigned one of three priority levels this leads to a subordinate set of $3^{13}=2,197$ possible load configurations that must be effectively managed within the larger context.

Conventional microgrid modeling and simulation to date is concerned with classic controls solutions (typically PID controllers, or a subset, that employ feedback to minimize an error signal and thus ensure stable operation), or modeling that tries to capture the dynamics of complex power (real and reactive), as with generators and switched loads, again with an eye to improve stability and to allow design engineers to properly specify system components. The latter are typically computationally demanding. A system comprising two simplified 3-phase generator models in parallel driving common loads may require 20 minutes of simulation time to compute a 5 second response interval on a typical workstation. Simulations involving many more components and 24 hour intervals are impractical.

As can be seen, there is a need for a means to methodically develop microgrid control algorithms which address system complexity and efficiently verify their performance.

SUMMARY OF THE INVENTION

In one aspect of the present invention, a method of developing controls for a microgrid system includes identifying a plurality of components composing the microgrid system; assigning state variables to each of the components in the microgrid system, wherein the aggregate state status represents a plurality of possible states; determining an overall power balance of the microgrid system, wherein the power balance is based on numerical values for each of the source and load components and the state of the associated switching components; and using the one or more state machines to implement candidate algorithmic control structures.

In another aspect of the present invention, a method of developing controls for a microgrid system includes identifying a plurality of components in the microgrid system; determining a binary state status for each of the switching components in the microgrid system; determining an overall power balance for the microgrid system, wherein the power balance is based on an algebraic sum of the contributions of each of the components; perturbing the system state by means of variation of one or more of the components; and determining the suitability and effectiveness of the control algorithms embodied in the one or more state machines by analyzing the resulting system behavior.

In yet another aspect of the present invention, a set of computer readable instructions comprising computer readable media includes a set of instructions for modeling a plurality of components in a simulated microgrid system to be analyzed; a set of instructions for assigning a state status to each of the components in the simulated microgrid system, wherein the state status represents enabled and disabled states of the components and continuously variable values for sources and loads; a set of instructions comprising the system control structures (algorithms) using one or more state machines, wherein the power balance is based on an output value of each of the components under the assigned state status; a set of instructions for varying the state of one or more of the components; a set of instructions for recording the state of the system as a time series (history) of all system parameters; and a set of instructions to evaluate the performance of the simulated microgrid system and the control structures modeled by the one or more state machines under test.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a method that models a microgrid system on fundamental terms. Development of control algorithms for modern microgrid systems is increasingly challenging as these systems become more complex. The ensemble of state variables needed to specify such systems can quickly become very large. Some systematic method to arrive at an optimal control configuration would benefit the art. Exemplary embodiments of the present invention achieve this by developing, in one aspect, the absolute minimal model that still reflects relevant system behaviors. Candidate control algorithms may be implemented as state machines that can affect state variables which represent control signals for elements of the physical system. This allows even complex systems to be analyzed by means of very fast simulations, which in turn admits much greater depth (for example, the number of system parameters investigated) and breadth (for instance, long simulation times can become practical, (for example, year long simulations to investigate seasonal environmental effects)). The end results using embodiments of the present invention may be optimal control routines that are robust and verified before implementation in a physical microgrid.

In one aspect, the method may be employed as set of computer readable instructions comprising computer readable media. Simulated performance of the microgrid may be modeled according to the system state being defined by the overall power balance among microgrid components and the states of the various components and subsystems. The power balance may be the algebraic sum of enabled sources and loads. The model emulates the system by manipulating Boolean state variables, which will be implemented as switchgear control signals in the physical system. Algorithms may be developed or modified that can be extensively tested. For example, the complex grid described above that includes 15 switchgear variables associated with sources and 13 with loads and 4 switching components can be simulated over a 24 hour period in under 5 seconds (at one minute temporal resolution).

Using a model based on determining the power balance in a system, very complex interactions can be made computationally tractable. A diverse collection of loads (based on actual data, or designed to 'stress' the system and discover performance limits) can be parameterized with respect to time. Sources and storage systems can be modeled 'behaviorally' as the effects that their presence or absence on the microgrid would present. Performance (e.g. load availability or fuel consumption) can be quantified over large simulation intervals. Runs in excess of one year have been performed to determine the effect of seasonal variations on environmental control systems under aspects of the present invention.

Testing and evaluation of the parameterized system model can be automated such that comprehensive investigations of a complete system are possible (full experimental coverage). If the example cited above were taken as an expansion of the state space to $2^32 \times 3^13 = 2.25 \times 10^6$ states, a thorough evaluation of a proposed set of control algorithms could still be performed in a reasonable time by means of sampled as opposed to continuous parameters under exemplary embodiments of the present invention.

The capability to fully parameterize a microgrid system model (including sources, loads, storage and control structures) and to script (automate) simulation and data collection enables a systematic investigation and comparison of control algorithms. For example, optimization for load availability versus fuel economy or grid reliability is likely to present conflicting control requirements. Aspects of the subject technology described allow efficient and effective assessment of design solutions.

In one aspect, exemplary embodiments include a method of developing and testing control algorithms for microgrid power systems. In another aspect, the development and testing of controls may be implemented on a computer in a simulation.

Figure 1:
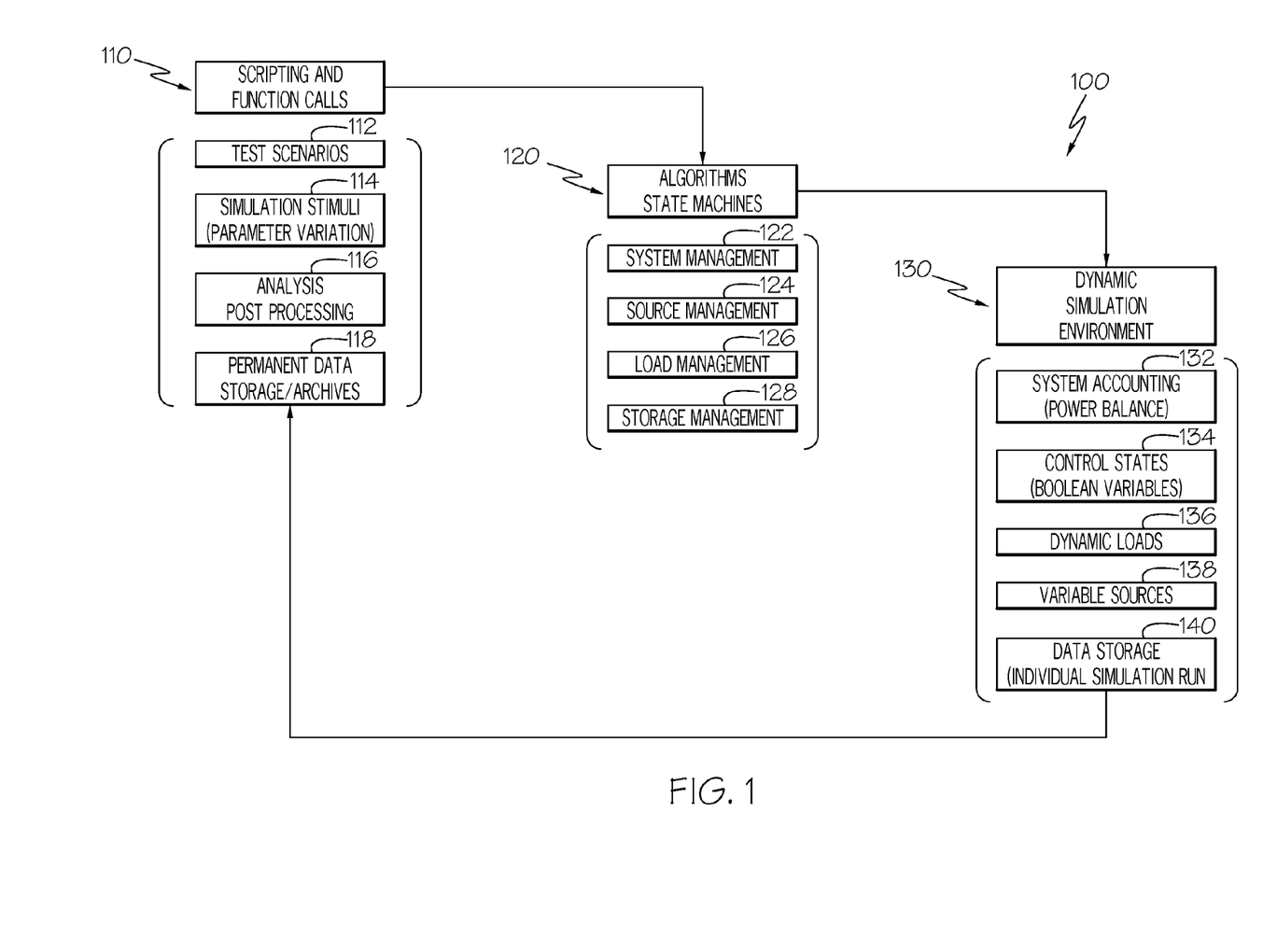
FIG. 1 is a flowchart showing a hierarchy of microgrid control development in accordance with an exemplary embodiment of the present invention.

Referring now to FIG. 1, a flowchart showing a hierarchy 100 of microgrid control development is shown. The hierarchy 100 may include three levels of modeling a microgrid system: a scripting and function calls level 110, an algorithms and state machines level 120, and a dynamic simulation environment 130.

The scripting and function calls level 110 may be a top level of control development providing instructions for the modeling and simulation of a microgrid system. The scripting and function calls level 110 may include software instructions that provide supervisory functions to direct the algorithms and state machines level 120 to perform actions on the dynamic simulation environment 130. For example, the scripting and function calls level 110 may include instructions in a test scenarios module 112 that call for the level 120 to operate the dynamic simulation environment under various test conditions. The test scenarios module 112 may include instructions for example, that simulate conditions that stress the microgrid system. As another example, the test scenarios module 112 may include instructions that find models which optimize load availability compared to energy source usage in a system. A simulation stimuli module 114 may include instructions that vary the parameters of operation in the system. For example, instructions from the simulation stimuli module 114 may call for various source availability and various load availability. An analysis and post processing module 116 may include instructions that analyze the performance of the system under the different test scenarios and parameter variations employed. A permanent data storage and archives module 118 may record and store data over time on the performance of the system.

Optimization of the algorithms and state machines level 120 is an aspect of the present invention that provides quickly definable results in the physical system. The algorithms and state machines level 120 may include software instructions that adjust the status states (enable or disable) of the components in a microgrid system in response to operational goals or external factors (such as environmental parameters). In another aspect, the algorithms and state machines level 120 may include data structures that model and track the status of components and system parameters. The algorithms and state machines level 120 may include for example, a system management module 122, a source management module 124, a load management module 126, and a storage management module 128. The system management module 122 may include instructions for tracking overall system data, for example, the power balance between loads and sources in a system, and for integrating the behaviors resulting from the operation of the other management modules. The source management module 124 may include instructions that control the scheduling, enabling and disabling of sources in the microgrid. The load management module 126 may include instructions that control the prioritization, enabling and disabling of loads in the microgrid. A storage management module 128 may include instructions that control the charging, discharging, enabling and disabling of storage components in the microgrid. For example, in some cases, the microgrid may need increased power resources and the storage management module 128 may include instructions to enable some of the storage components to provide power.

The dynamic simulation environment 130 may be a model of the physical microgrid under investigation. In one aspect, the dynamic simulation environment 130 may include the physical components in a microgrid being operated. The physical components may include, for example, power sources, power loads, switching gear, power storage devices, and data storage devices. The dynamic simulation environment 130 may include for example, system accounting components 132, control states 134, dynamic loads 136, variable sources 138, and data storage elements 140. The system accounting components 132 may include summation devices that sum together, for example, the total source power in a microgrid and the total load power needs in the microgrid for a given configuration of enables and disabled devices. The control states 134 may represent multiple status states for the components in the microgrid. The status states, may, in an exemplary embodiment, be binary or Boolean value states 134 for switching devices, values representing dynamic loads 136, values representing variable sources 138, or storage devices, for example, being in an charge/discharge or in a disabled/enabled state. During the simulation of microgrid system performance, the data associated with that simulation may be stored in data storage 140 and communicated to the permanent data storage/archives 118.

Figure 2:
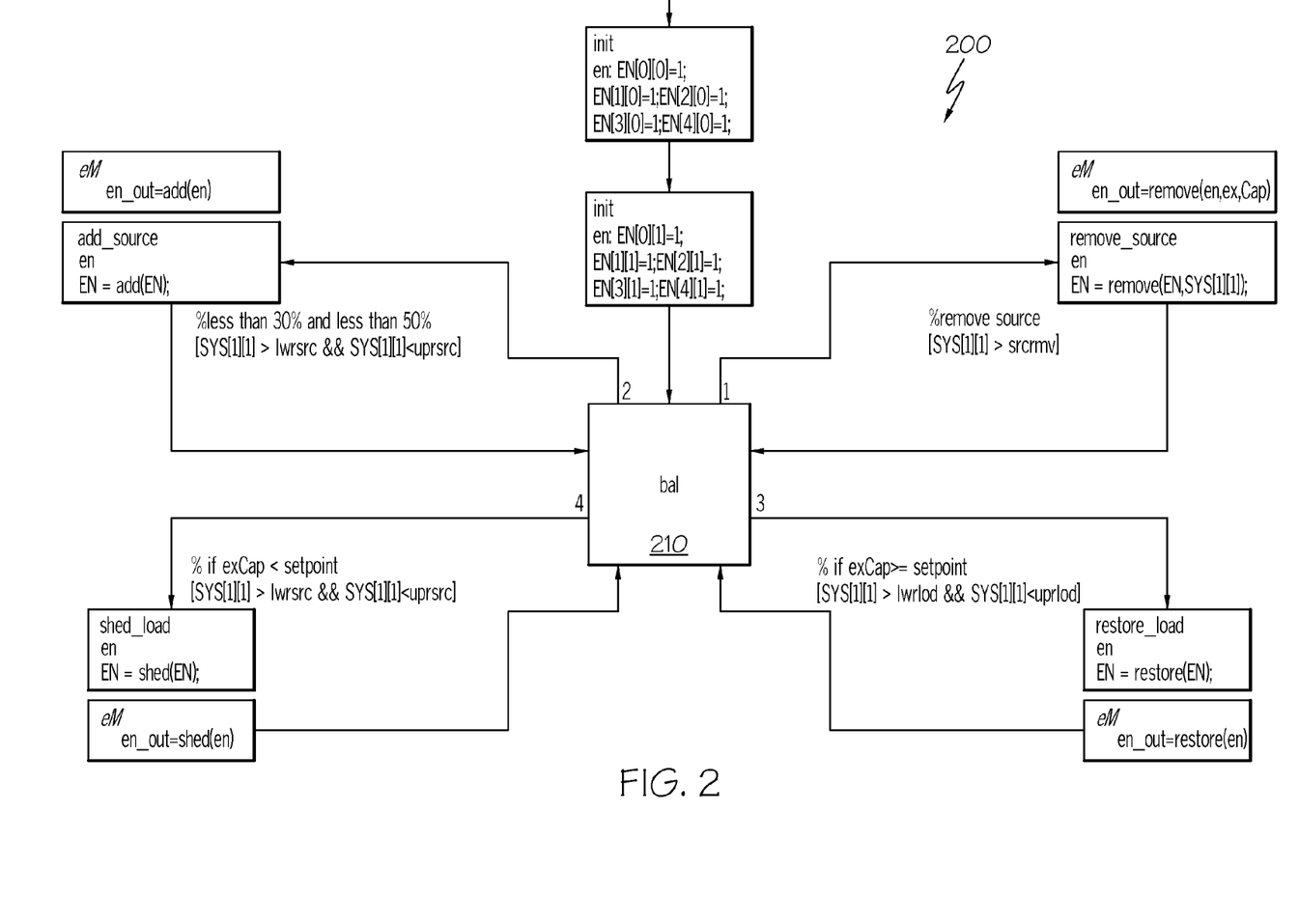
FIG. 2 is an exemplary algorithm represented as a state machine used in the microgrid controls development of FIG. 1.

Referring now to FIG. 2, an example of a control algorithm implemented as a state machine 200 is shown. The machine 200 shows a simplified control model that combines load and source management. The state machine 200 models one possible control algorithm which allows the system to respond to a disequilibrium condition by changing the appropriate state variables (these represent switchgear control signals in a physical system). One possible priority of actions is represented where in this exemplary control, removing a source has priority over adding a source, which has priority over restoring a load and shedding a load. "Removing" or "shedding" actions may be understood to represent components being in an "off" state. "Adding" actions may be understood to represent components in an "on" state. The end result of these actions and transitions is a microgrid system that has responded to one or more perturbations and returned to an equilibrium condition. This may be represented by the central state 210 (labeled "bal") as a resultant power balance.

Figure 3:
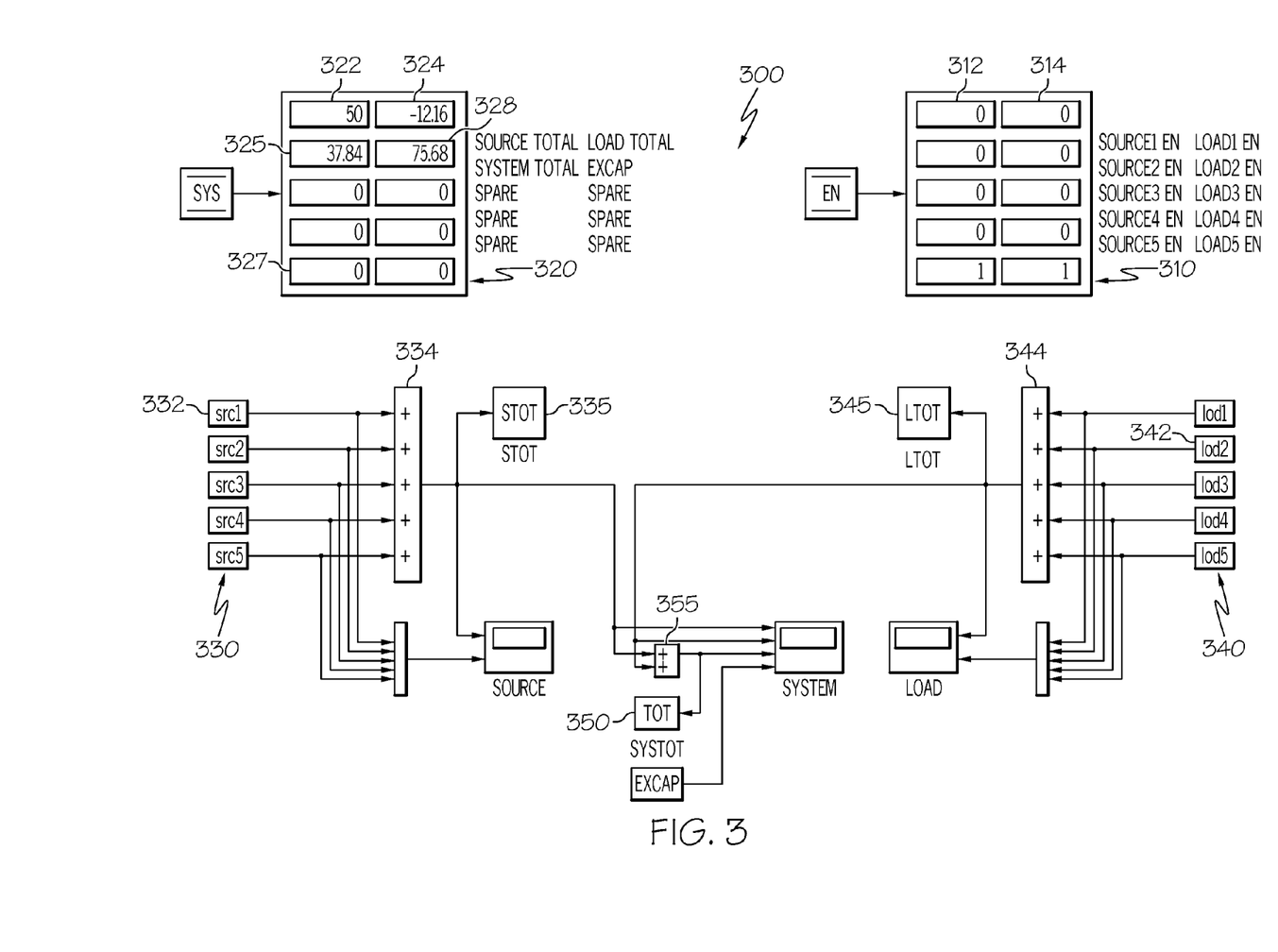
FIG. 3 is a diagram of a method of calculating a power balance in a microgrid system in accordance with an exemplary embodiment of the present invention.

Referring now to FIG. 3, a diagram that illustrates control development for a system with 10 elements is shown. A power balance calculation simulation 300 is shown. The simulation includes a source/load status state table 310, a system summary table 320, a source side 330 of power input, a load side 340 of power sinks, and a system total power summation 350. A Boolean data structure that implements switchgear status states is shown in source/load status state table 310. The table 310 includes source status states 312 and load status states 314. Only source 5 (at 50 kW) and load 5 (at 12.16 kW) are enabled in the exemplary table 310 shown. The power associated with each enabled source 332 may be aggregated in a summation section 334 providing a system source total 335. The power associated with each enabled load 342 may be aggregated in a summation section 344 providing a system load total 345. A system power balance total 350 may be the algebraic sum of the system source total 335 and the system load total 345 summed together in a section 355. In the example shown, with only source 5 and load 5 enabled, the source total 335 is 50 kW and the load total 345 is 12.16 kW. In one aspect, the sources may be represented by positive values and the loads may be represented by negative values. Thus, the power balance total may, in this exemplary component configuration be 37.84 kW power rating. The values for the source total, load total and system power balance may be displayed in fields 322, 324, and 325 respectively, which reflect the contents of system data structures. Excess capacity available to the system may be tracked in field 328.

Figure 4A:
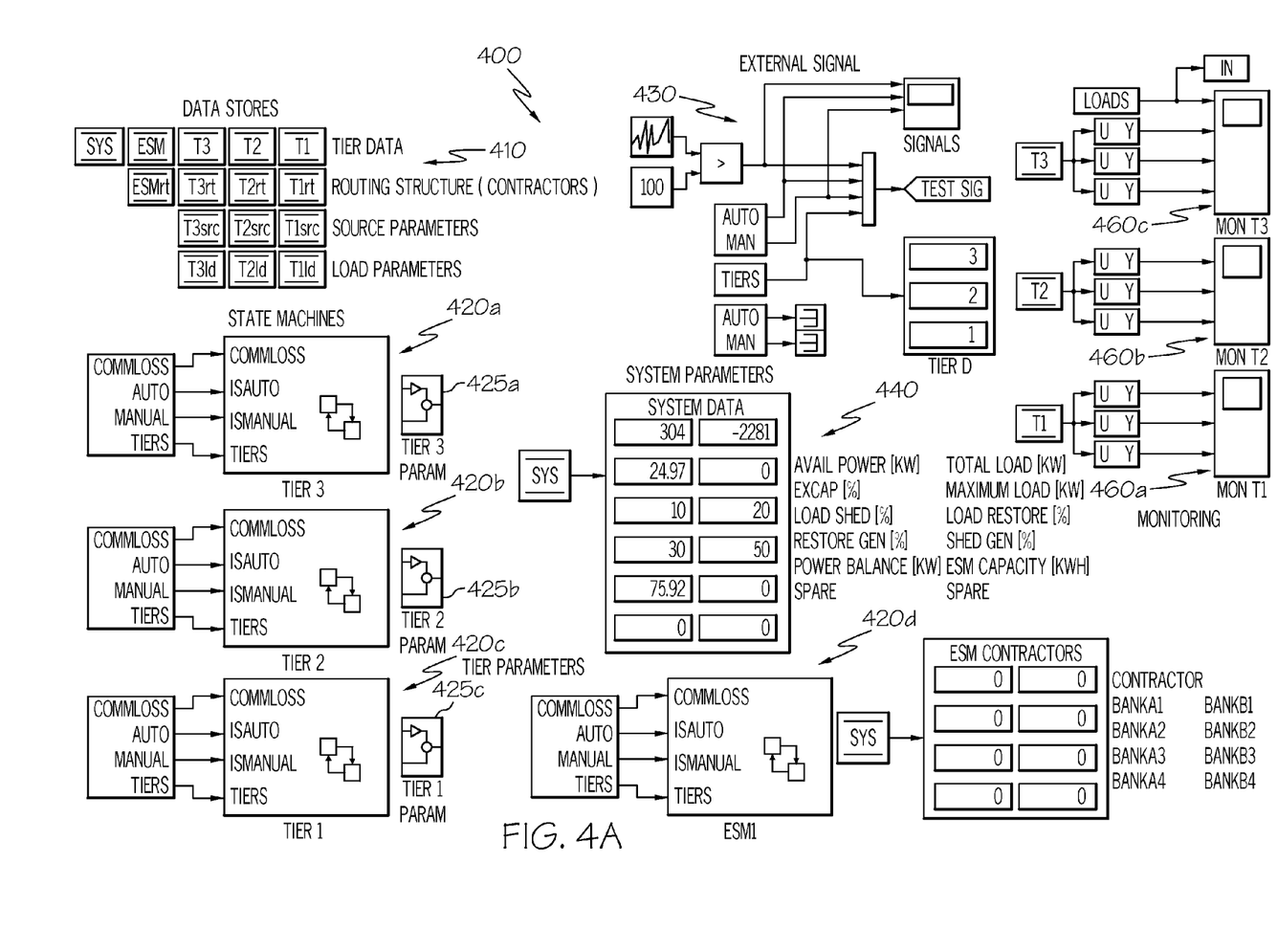
FIG. 4A is a diagram of an exemplary microgrid system simulation in accordance with an exemplary embodiment of the present invention.
Figure 4B:
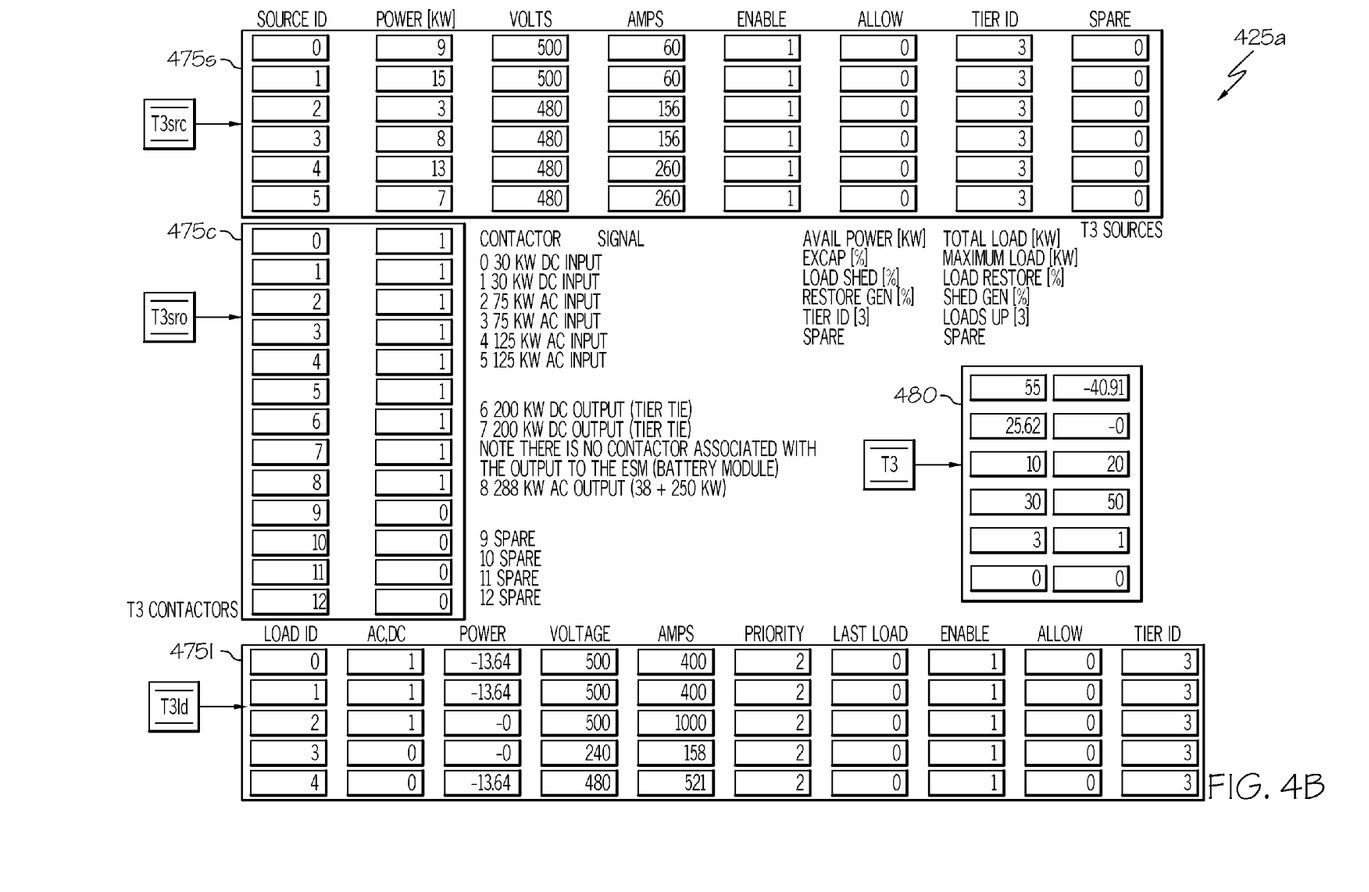
FIG. 4B is a diagrammatic representation of data structures associated with a tier parameter block of FIG. 4A.

Referring to FIGS. 4A and 4B, a behavioral model 400 (FIG. 4A) for an exemplary switching system (only top level of the design hierarchy shown) and a diagrammatic representation (FIG. 4B) of data structures associated with a tier parameter block 425a are shown according exemplary embodiments of the present invention. The system represented comprises 3 interconnected grid modules (designated as "Tier1", "Tier2", and "Tier3"), 15 sources, 13 loads and a 480 kWhr storage module. The behavioral model 400 may represent as blocks, a data stores section 410, state machines 420, and system parameters 440.

The data stores section 410 may for example, represent the data associated with the equipment within each grid module. The data stores section 410 may be analogous to the elements in the dynamic simulation environment 130.

The state machines 420 (shown as four state machines 420a, 420b, 420c, and 420d) may embody the control algorithms that specify system operational behavior. The state machines 420 may represent the modeling construct for the algorithms and state machines section 120 of FIG. 1. State machines 420a, 420b, and 420c may represent, for example, the control structures of three different modules of switch gear and power routing equipment associated with the system. The state machines 420a, 420b, and 420c may implement instructions on, for example, evaluating load capacities, and source availability based on the tier parameters 425a, 425b, and 425c, and may alter various state variables accordingly. Referring for the moment to FIG. 4B, the block representing, for example, 425a, may include data structures 475 (475c, 475l, 475s) for all sources and loads connected to "Tier3". In the exemplary representation of block 425a shown, the sources and loads are represented by tables designated as "T3 sources" and "T3 loads". Block 425a may include a modeling structure 475c that models all the binary (switchgear) devices contained within the tier ("Tier3"). Block 425a may also include a modeling structure 480 that monitors all the system parameters specific to the tier ("Tier3").

The state machines 420 may alter system state variables as needed to achieve the desired system end performance. For example, the model may adjust the state status of components to provide optimized load availability during a simulation. The behavior model 400 may adjust the state status of components to determine performance boundaries of the microgrid system. State machine 420d may represent the control algorithms for an energy storage module (ESM).

The system parameters section 440 may include a table summarizing the system performance data. For example, data such as the power balance may be evaluated to determine whether the system is in a defined state of operability.

An external signaling section 430 may include structures that model other factors external to the microgrid proper. Examples of factors included in modeling may be environmental (temperature, solar load, wind, etc.) or failure modes etc. In the example shown a communications (signal) loss between tiers is being modeled as a random event occurring a specific percentage of the time to determine how robust the behavior of the interoperable control algorithms is during such events.

A monitoring section 460 may include monitors (460a, 460b, and 460c) for each tier being evaluated. Data (for example, total loads, power available, and excess capacity) associated with each tier in each state of switching may be recorded and displayed. The resultant data may be stored as collection of power sources and loads, parameterized over time. The performance of the microgrid system may be tracked as time series data.

The external signals section 430, system parameters section 440, and monitoring section 460 may be elements of the scripting and function calls 110 (FIG. 1). It may be appreciated that a system including this exemplary complexity may be analyzed under a 24 hour simulation of this model in less than 5 seconds. This is a pronounced performance improvement over prior art and is a result of simplifying the model of the physical system such that it is represented by only absolutely essential features. Computational performance gains are thus realized.

Figure 5:
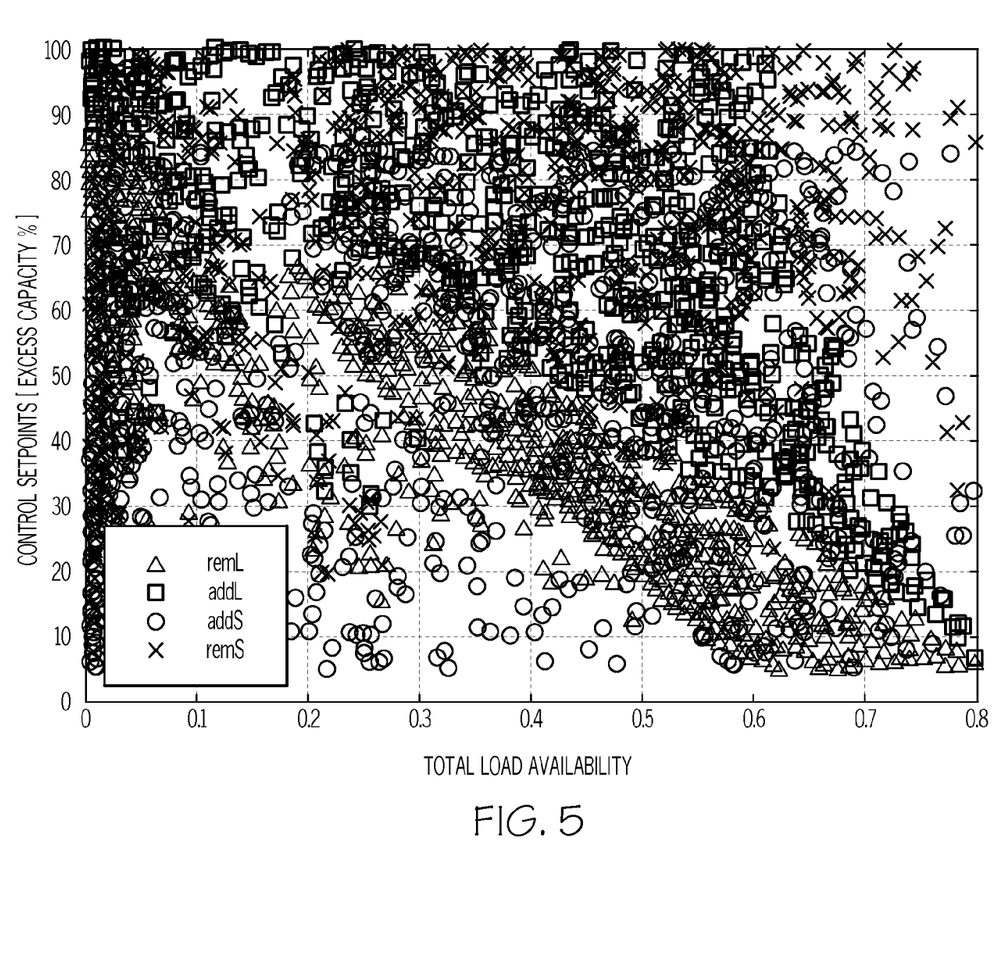
FIG. 5 is an exemplary plot of extended simulation results generated in accordance with an exemplary embodiment of the present invention showing the relationship of excess system capacity to load availability as a function of setpoints.

FIG. 5 is a plot showing extended simulation results illustrating the relationship of excess system capacity to load availability as a function of four system parameters known as setpoints It was generated using aspects of the present invention to investigate a grid design (having 6 source ports and 6 load ports) using Monte Carlo techniques. The plot points represent time series data of switchgear configurations of various elements in on/off states (for example, "removed loads", "added loads", "added sources", and removed sources"). The load and source setpoints were generated at random, and each of these used to control the grid for 500 'days' of random load variation. In this case, 1,249 'years' of results were obtained over the course of a weekend of unattended simulation.

It should be understood, of course, that the foregoing relates to exemplary embodiments of the invention and that modifications may be made without departing from the spirit and scope of the invention as set forth in the following claims.

What is claimed is:

1. A method of developing a set of computer readable control algorithms stored on non-transitory computer readable media for simulation of operation of a microgrid system, including:
developing a model of a physical form of the microgrid system;
identifying a plurality of loads and sources in the modeled microgrid system;
assigning one or more state variables to each of the loads and sources in the modeled microgrid system, wherein the state variables represent a plurality of possible states;
implementing candidate algorithmic control structures on the modeled microgrid system as state machine model elements that simulate control of the respective state variables of the loads and sources, wherein the state variables represent power routing of the microgrid system;
simulating operation of the microgrid system according to the implemented candidate control algorithmic control structures;
determining an overall power balance on the microgrid system based on individual states of aggregate system power sources and loads of the model, wherein the power balance is based on a value of each of the state variables of each of the loads and sources;
selecting an optimal set of the algorithmic control structures for use in performing simulations of the microgrid, said selection being based on the selected set of control algorithms being capable of controlling a simulation of a desired simulation period within a minimal amount of computer processing time; and
storing the selected set of control algorithms on the non-transitory computer readable media.

2. The method of claim 1 including:
determining system operational parameters other than the power balance serve as performance indicators of the microgrid system; and
developing the microgrid controls based on the system operational parameters.

3. The method of claim 1 including adjusting the state variables of switch gear, loads and power sources to optimize load availability compared to power source usage.

4. The method of claim 1 wherein the state variables are Boolean.

5. The method of claim 3, including adjusting the state variables of the switch gear, loads, and sources and determining performance limits of the microgrid system.

6. The method of claim 5 including representing the status of the state variables of switch gear, loads, and sources as time series data.

7. The method of claim 6 including tracking the performance of the microgrid system based on the time series data.

8. A method of developing a set of computer readable algorithmic control structures stored on non-transitory computer readable media for simulation of operation of a microgrid system, including:
developing a model of a physical form of the microgrid system in accordance with a hierarchy that includes a scripting and function calls level, an algorithms and state machines level, and a dynamic simulation environment;
identifying a plurality of components in the modeled microgrid system;
assigning one or more state variables to each of the components in the modeled microgrid system, wherein the state variables represent a plurality of possible states;
implementing candidate control algorithms on the modeled microgrid system as state machine model elements that control the respective state variables of the components, wherein the state variables represent power routing of the microgrid system;
simulating operation of the microgrid system according to the implemented candidate control algorithmic control structures;
determining a system source power total during the simulated operation;

determining a system load power total during the simulated operation;

determining an overall power balance on the microgrid system based on an algebraic sum representing an aggregate total of the system source power total and the system load power total;

selecting an optimal set of the algorithmic control structures for use in performing simulations of the microgrid, said selection being based on the selected set of control algorithms being capable of controlling a simulation of a desired simulation period within a minimal amount of computer processing time; and storing the selected set of algorithmic control structures on the non-transitory computer readable media.

9. The method of claim 8 wherein the components include loads and sources.

10. The method of claim 9 wherein the system source total is based on a summation of sources being enabled and the system load total is based on a summation of the loads being enabled.

11. The method of claim 9 wherein the loads and sources are represented as positive or negative signed values.

12. The method of claim 9 wherein microgrid power routing between sources and loads is accomplished using switch gear.

13. The method of claim 8 includes simulating the overall power balance on the microgrid system for each adjustment of the state variables of the components using a computer-implemented series of steps.

14. The method of claim 8 including tracking the power balance of the microgrid system for each adjustment of the state variables of the components.

15. A set of computer readable instructions stored on non-transitory computer readable media including:

a set of instructions for identifying a plurality of components to be modeled in a simulated microgrid system;

a set of instructions for assigning one or more state variables to each of the components in the simulated microgrid system, wherein the respective states include the enabled or disabled states of the components;

a set of instructions for determining an overall power balance on the simulated microgrid system controlled by one or more state machines, wherein the power balance is based on a state variable value of each of the components at a given simulation time;

a set of instructions for modifying the state variables of the components;

a set of instructions for determining the overall power balance on the simulated microgrid system controlled by one or more state machines for each adjustment of the state variables of the components; and a selected set of algorithmic control structures for use in performing simulations of the microgrid system, said selection being based on the selected set of control algorithms being capable of controlling a simulation of a desired simulation period within a minimal amount of computer processing time.

16. The set of computer readable instructions of claim 15 including a set of instructions for adjusting the state variables of components in the system being modeled to provide optimized load availability.

17. The set of computer readable instructions of claim 15 wherein the components include switch gear employed in routing available energy sources to loads.

18. The set of computer readable instructions of claim 15 wherein the overall power balance is determined based on summing values for the available energy sources with corresponding values of the loads.

19. The set of computer readable instructions of claim 18 wherein the loads and sources are represented as positive or negative signed values.

20. The set of computer readable instructions of claim 15 including systematic adjustment of the state variables of the components to determine the performance boundaries of the microgrid system.

\* \* \* \* \*